United States Patent [19]

Hadank

[11] 3,745,547
[45] July 10, 1973

[54] LAMP SUPERVISORY CIRCUIT
[75] Inventor: Walter Robert Hadank, Springfield, Mass.
[73] Assignee: Standard Electric Time Corporation, Springfield, Mass.
[22] Filed: June 22, 1972
[21] Appl. No.: 265,149

[52] U.S. Cl. .............................. 340/251, 340/256
[51] Int. Cl. ......................................... G08b 21/00
[58] Field of Search ........................... 340/251, 256; 315/82, 83

[56] References Cited
UNITED STATES PATENTS
3,355,601  11/1967  Klein ........................... 340/251 UX
3,514,751  5/1970   Pascente ....................... 340/251 X
3,558,972  1/1971   Hiroshi Arai .................. 340/251 X
3,643,247  2/1972   Ratcliffe ...................... 340/256 X
3,706,983  12/1972  Olson et al .................... 340/251

Primary Examiner—John W. Caldwell
Assistant Examiner—Daniel Myer
Attorney—John A. Dienner, Arthur J. Wagner et al.

[57] ABSTRACT

A lamp supervisory circuit for detecting failure of at least one indicator lamp includes a branch circuit including the indicator lamp and a resistor connected in series across a source of potential permitting a trickle current to flow through the lamp normally providing a voltage at a first level at the junction point of the indicator lamp and the resistor, a voltage at a second level being provided at the junction point upon failure of the lamp, and monitoring apparatus connected to the junction point which is responsive to a voltage at the second level to enable a fault indicating circuit to indicate failure of the lamp; switch apparatus connected in parallel with the resistor is operable to short out the resistor by extending a voltage at a third level to the junction point, thereby effecting illumination of the indicator lamp; the monitoring apparatus including a relay enabled whenever a voltage at the third level is provided at the junction point to inhibit the enabling of the fault indicating circuit.

10 Claims, 1 Drawing Figure

LAMP SUPERVISORY CIRCUIT

LAMP SUPERVISORY CIRCUIT
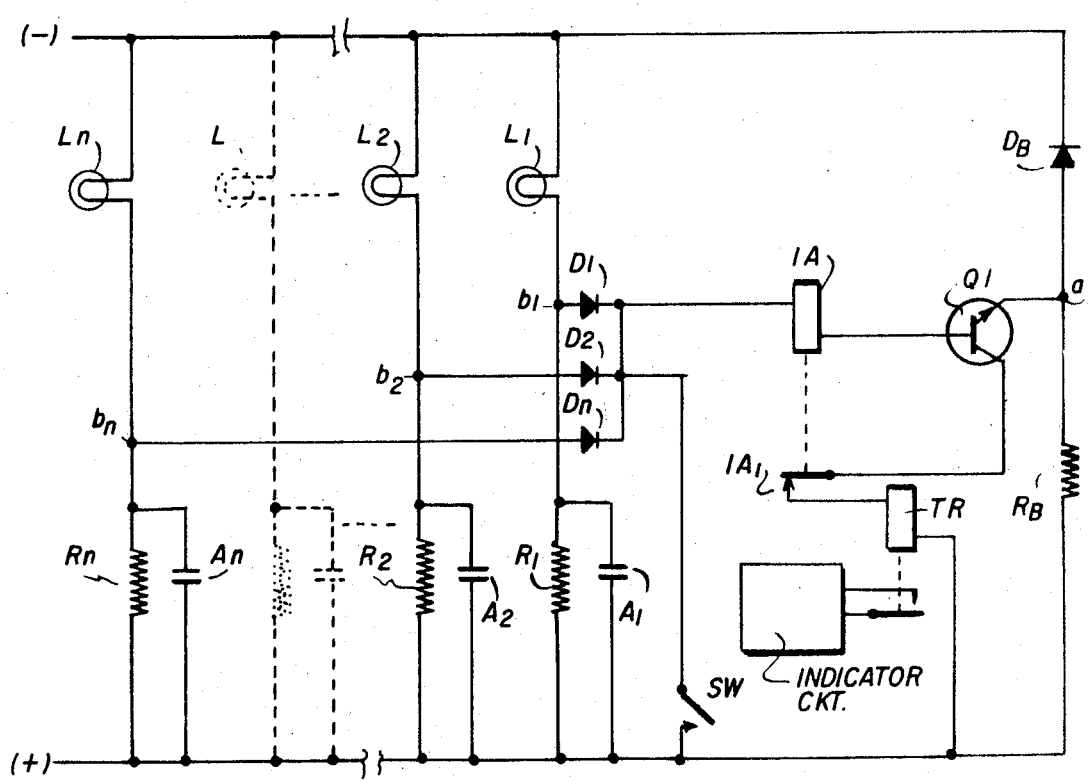

LAMP SUPERVISORY CIRCUIT

BACKGROUND OF THE INVENTION

1. Field of the Invention

This invention relates to component supervisory circuits for detecting component failures and, more particularly, to a supervisory circuit for detecting open-circuit conditions of elements of an electrical circuit.

2. Description of the Prior Art

Many electrical circuits employ condition indicating circuit devices, such as lamps for indicating various conditions. For example, in a security monitoring system, a plurality of indicator lamps may be provided on a panel board at a central monitor, each lamp individually energizable to indicate an unauthorized intrusion of a different protected area, for example, or the detection of fire in a protected area.

In the case of an intrusion alarm system, suitable intrusion detecting apparatus in each protected area provides a signal for lighting an associated indicator lamp corresponding to such protected area. However, with the use of circuit devices such as indicator lamps, one can never be certain that an unlit lamp simply indicates a signal has not been applied to the lamp or that the lamp is burned out and is incapable of performing an indicating function.

Accordingly, supervisory circuits have been proposed in the prior art for determining when a condition indicating device, such as a lamp, is functioning properly or is defective. However, many of these supervisory circuits permit testing of a given indicator lamp only when the lamp is energized for normal circuit operation. Hence, such supervisory circuits would not indicate removal of the lamp from the circuit or a filament failure prior to application of an enabling signal to the branch of the circuit including the lamp.

Other prior art supervisory circuits provide continuous monitoring of the conditions of circuit devices, such as indicator lamps, by sensing voltage levels at a point to which the lamp is connected in the circuit. However, some of these continuous monitoring circuits require a separate supervisory relay for each lamp to be monitored, adding substantially to the cost of the supervisory circuit. Moreover, in monitoring circuits wherein voltage levels at each lamp are continually sensed, means must be provided for distinguishing between voltages which are provided as a result of failure of the lamp and voltages which are provided as the result of the application of a control signal to a lamp for effecting illumination of the lamp under normal operating conditions.

SUMMARY OF THE INVENTION

The present invention provides a supervisory circuit for continuously monitoring the conditions of a plurality of circuit components, each connected in a separate branch circuit of the supervisory circuit. The supervisory circuit includes detecting means for monitoring the voltages at monitor points to which the circuit components are connected in the circuit. Whenever a voltage at one of the monitor points assumes a level indicative of a component failure in one of the branch circuits, the detecting means is operable to enable indicating means to provide an indication of such component failure.

In addition, the supervisory circuit includes switching means, commonly connected to all of the monitor points, which is operable whenever an enabling signal is extended to one of the circuit components to inhibit the indicating means to thereby prevent a component failure indication from being provided when a circuit component is enabled under normal operating conditions.

In accordance with an exemplary embodiment, the supervisory circuit of the present invention is described with reference to an application in a security alarm system wherein the conditions of a plurality of alarm indicator lamps are to be monitored. The branch circuits of the supervisory circuit each include one of the indicator lamps and a resistance means connected in series across a source of potential to provide a voltage at a first level at the junction of the indicator lamp and the resistance means whenever current is flowing through the branch circuit, and a voltage at a second level at the junction point whenever current flow over the portion of the branch circuit including the indicator lamp is interrupted. The value of the resistance means is selected to limit the current flowing through the indicator lamp to a value insufficient to cause perceptible illumination of the lamp.

The supervisory circuit further includes monitoring means having voltage detecting means and circuit means for connecting an input of the voltage detecting means to the junction points of each of the branch circuits. The circuit means includes the switching means, embodied as an alarm relay, having a first terminal connected to the input of the voltage detecting means, and diode means, including a plurality of diodes, each individually connected between one of the junction points and a second terminal of the alarm relay.

Under normal conditions, that is, whenever the potential at all of the junction points is at the first voltage level, the alarm relay is deenergized and the detecting means is disabled.

In the event of a failure of an indicator lamp in one of the branch circuits, a voltage at the second level will be provided at the corresponding junction point of the branch circuit. Such voltage is sufficient to enable the detecting means which in turn enables indicating means to provide an indication of a component failure in one of the branch circuits. However, such voltage will be ineffective to cause energization of the alarm relay.

On the other hand, in the event of an alarm condition which results in the application of a voltage at a third level to one of the junction points to effect illumination of the indicator lamp connected to that junction point, such voltage will effect energization of the alarm relay which inhibits enabling of the indicating means by the detecting means, even though the detecting means is enabled responsive to the voltage at that junction point.

Thus, the supervisory circuit provided by the present invention provides continuous monitoring of the conditions of a plurality of circuit devices by way of a voltage sensing technique, and further includes means which distinguishes between voltages which are provided as the result of failure of a circuit device and voltages which are provided under normal circuit operating conditions.

In accordance with a feature of the invention, the supervisory circuit includes a test switch connected between the second terminal of the alarm relay and a source of potential which, when operated, extends an energizing voltage to all of the indicator lamps over the diode means to thus permit simultaneous testing of all of the indicator lamps.

In accordance with a further feature of the invention, all of the indicator lamps are connected in a separate series circuit branch between output terminals of a voltage source, allowing a trickle current to flow through the indicator lamps. Such current is limited to a magnitude insufficient to produce noticeable illumination of the lamps. However, maintaining current flow through the filaments of the lamps reduces thermal shock to the lamp filaments whenever the lamps are energized for illumination.

Other objects and features of the invention will become apparent with reference to the following detailed disclosure and accompanying drawing which is a schematic circuit diagram of a supervisory circuit provided in accordance with the present invention.

DESCRIPTION OF A PREFERRED EMBODIMENT

Referring to the drawing, in accordance with an exemplary embodiment, the supervisory circuit 10 provided by the present invention provides continuous monitoring for open-circuit conditions for a plurality of indicator lamps, including lamps $L1$, $L2$, $Ln-1$ and $Ln$ shown in the drawing.

The indicator lamps $L1$, $L2$, $Ln-1$ and $Ln$ may, for example, be alarm indicator lamps of a security system which are selectively energized to indicate an alarm condition such as an unauthorized intrusion of a protected area, the detection of a fire in a protected area, etc. The indicator lamps may be located on a monitor panel at a central monitoring location. The indicator lamps $L1$, $L2$, $Ln-1$, $Ln$ are individually energizable by way of associated alarm lamp drive circuits represented in the drawing as normally open switch contacts $A1$, $A2$, $An-1$, $An$ for lamps $L1$, $L2$, $Ln-1$, $Ln$, respectively.

Each of the indicator lamps, such as lamp $L1$, is connected in series with an associated resistance, resistance $R1$ for lamp $L1$, in a branch circuit 11 between conductors $-V$ and $+V$ which are extended to negative and positive terminals, respectively, of a voltage source (not shown). The voltage source may, for example, provide a positive potential of 24 volts at the conductor $+V$ relative to the conductor $-V$.

The switch contacts $A1$ for indicator lamp $L1$ are connected in parallel with resistance $R1$ between junction $b1$ and conductor $+V$. The normally open alarm switch contacts $A1$, when operated by a suitable alarm drive circuit (not shown), extend an energizing potential to indicator lamp $L1$, causing lamp $L1$ to light, thereby providing a visual indication of an alarm condition at the monitor panel.

Similarly, the lamps $L2$, $Ln-1$, $Ln$ and associated resistances $R2$, $Rn-1$, $Rn$, respectively, are connected in respective series branch circuits 12-14 between conductors $+V$ and $-V$. Alarm switch contacts $A2$, $An-1$, and $An$ are connected in parallel with resistances $R2$, $Rn-1$, and $Rn$, respectively, to permit selective energization of lamps $L2$, $Ln-1$ and $Ln$.

The supervisory circuit 10 comprises monitoring apparatus 15 including a plurality of diodes, such as diodes $D1$, $D2$, $Dn-1$ and $Dn$ shown in the drawing, an alarm relay 1A, and a voltage detecting circuit 16, including a switching transistor $Q1$.

Diodes $D1$, $D2$, $Dn-1$ and $Dn$ have anodes individually connected to one of the junctions $b1$, $b2$, $bn-1$, and $bn$ of branch circuits 11-14. The cathodes of the diodes $D1$, $D2$, $Dn-1$, $Dn$ are commonly connected to a first terminal 18 of the coil of alarm relay 1A. The coil of alarm relay 1A has a second terminal 17 connected to the base of the switching transistor $Q1$.

The emitter of transistor $Q1$ at point $a$ is connected over a diode DB to conductor $-V$ and also over a resistance RB to the conductor $+V$. The collector of transistor $Q1$ is connected over normally closed contacts 1A1 of the alarm relay 1A and a control relay TR to conductor $+V$. Relay TR has normally open contacts TR1 connected to a fault indicating circuit 19 which is operable when energized to provide an indication of a failure of an indicator lamp in one of the branch circuits 11-14.

In operation, assuming that lamp $L1$ is in proper operating condition, that is, the filament 20 of lamp $L1$ is intact, then a small current, limited in value by resistance $R1$ will flow over the branch circuit 11 from the conductor $+V$ to the conductor $-V$. Accordingly, due to the voltage divider affect of resistance $R1$ and lamp $L1$, a voltage will be provided at the junction $b1$ of resistance $R1$ and lamp $L1$. The value of resistance $R1$ is selected to provide a voltage of approximately 0.2 volts at junction point $b1$ under these conditions. This voltage at 0.2 volts appears at the base of switching transistor $Q1$.

The potential at the emitter of transistor $Q1$ at point $a$ is maintained at approximately 0.6 volts by proper selection of a value for resistor RB. Accordingly, transistor $Q1$ is normally reverse biased since the potential at the emitter of transistor $Q1$ is more positive than the potential at the base of transistor $Q1$ by approximately 0.4 volts. Under such conditions, relays 1A and TR are both deenergized.

If lamp $L1$ burns out, whereby its filament 20 becomes an open circuit for the portion of branch circuit 11 which includes lamp $L1$, the voltage at junction $b1$ will increase in a positive direction until diode $D1$ and transistor $Q1$ become forward biased. At such time, the potential difference between junction point $b1$ and point $a$ permits current flow from conductor $+V$ through resistor $R1$, diode $D1$, the coil of alarm relay 1A, the base-emitter circuit of transistor $Q1$ and diode DB to conductor $-V$. The magnitude of the current flowing over such path is limited by resistance $R1$ to approximately 1.5 ma.

The characteristics of transistor $Q1$ are such that a base current of 1 ma will produce a collector current of approximately 30 ma for transistor $Q1$. Such collector current will flow from conductor $+V$ over relay TR, normally closed contacts 1A1 of alarm relay 1A, the collector-emitter circuit of transistor $Q1$ and diode DB to negative conductor $-V$.

The turn-on current required to energize relays 1A and TR is approximately 30 ma. Accordingly, relay TR will be energized by the collector current of transistor $Q1$, closing contacts TR1 to enable the fault indicating circuit 19 to provide an indication of an open circuit condition in one of the branch circuits 11-14, branch circuit 11 in the present example. However, since only 1.5 ma is flowing over the circuit path including alarm relay 1A, the alarm relay 1A will not be energized as the result of a component failure in one of the branch circuits 11-14.

In the event of an alarm condition for a protected area corresponding to indicator lamp $L1$, the associated switch contacts $A1$ will be closed, shorting out resistance $R1$ such that the potential at junction point $b1$ increases to +24 volts, the potential at conductor +V, and causing lamp L1 to be lit. In addition, such potential will cause diode D1 and transistor Q1 to become forward biased, and current in excess of 30 ma will flow from junction point b1 over diode D1, the coil of alarm relay 1A, the base-emitter circuit of transistor Q1, and diode DB to conductor −V. Accordingly, alarm relay 1A will be energized thereby opening contacts 1A1 which are connected in series with relay TR in the collector of transistor Q1. Consequently, relay TR will be inhibited from operating, and a fault indication will not be provided even though switching transistor Q1 is turned on.

It is pointed out that although the operation of the lamp supervisory circuit 10 has been described with reference to the operation of only one of the indicator lamps L1, failure of any of the other indicator lamps, such as lamps L2, L$n$-1, L$n$, will, of course, be detected by the supervisory circuit 10 to provide an indication of such component failure. Moreover, the alarm relay 1A of the supervisory circuit 10 will be energized, whenever one or more of the indicator lamps L1, L2, L$n$-1, L$n$ is energized to indicate an alarm condition, and thus, the operation of relay TR will be inhibited and a component fault indication will not be provided.

In accordance with a feature of the invention, the supervisory circuit 10 includes a lamp test switch SW which is connected between conductor +V and the cathodes of the diodes, including diodes D1, D2, D$n$-1, D$n$ associated with the lamps L1, L2, L$n$-1, L$n$, respectively. Whenever lamp test switch SW is closed, +V potential is extended to the cathodes of all of the diodes D1, D2, D$n$-1, D$n$ enabling all of the lamps L1, L2, L$n$-1, L$n$ to be energized to thus provide simultaneous testing of all of the alarm lamps L1, L2, L$n$-1, L$n$.

I claim:

1. In a supervisory circuit for detecting failure of at least one electrical circuit device, a first circuit branch including said circuit device and resistance means connected in series across a source of potential to provide a voltage at a first level at the junction of said circuit device and said resistance means whenever current is flowing through said circuit device, and a voltage at a second level at said junction whenever current flow over a portion of said first circuit branch, including said circuit device, is interrupted, the value of said resistance means being selected to limit the current flowing through said circuit device to a value insufficient for enabling said circuit device, enabling means connected to said junction and operable to extend a voltage at a third level to said junction to enable said circuit device, and monitoring means connected to said junction, said monitoring means including indicating means enabled whenever the voltage at said junction is at said second level to provide an indication that current flow through said circuit device has been interrupted, and alarm relay means energized whenever the voltage at said junction is at said third level to inhibit the enabling of said indicating means.

2. In an alarm monitoring circuit including at least one indicator lamp for indicating an alarm condition when illuminated, a lamp supervisory circuit for detecting failure of the indicator lamp comprising, a first circuit branch including said indicator lamp and resistance means connected in series across a source of potential to provide a voltage at a first level at the junction of said indicator lamp and said resistance means whenever current is flowing through said first circuit branch and a voltage at a second level at said junction whenever current flow over a portion of said first circuit branch, including said indicator lamp, is interrupted, the value of said resistance means being selected to limit the current flowing through said indicator lamp to a value insufficient to cause perceptible illumination of said indicator lamp, alarm switch means connected in parallel with said resistance means for shorting out said resistance means in response to an alarm condition to provide a voltage at a third level at said junction to thereby permit current sufficient to cause illumination of said indicator lamp to flow through said portion of said first circuit branch, and monitoring means connected to said junction, said monitoring means including fault indicating means enabled whenever the voltage at said junction is at said second level to provide an indication that current flow over said portion of said branch circuit has been interrupted, and alarm relay means energized whenever the voltage at said junction is at said third level to inhibit the enabling of said fault indicating means.

3. In an alarm condition monitoring circuit including at least one indicator lamp for indicating an alarm condition when illuminated, a lamp supervisory circuit for detecting failure of the indicator lamp comprising, a branch circuit including said indicator lamp and resistance means connected in series across a source of potential to provide a voltage of a first level at the junction of said indicator lamp and said resistance means whenever current is flowing through said branch circuit and a voltage at a second level at said junction whenever current flow over a portion of said branch circuit, including said indicator lamp, is interrupted, the value of said resistance means being selected to limit the current flowing through said indicator lamp to a value insufficient to cause perceptible illumination of said indicator lamp, monitoring means including voltage sensing means, first circuit means connected between said junction and an input of said voltage sensing means, and fault indicating means, said voltage sensing means being operable whenever a voltage at said second level is provided at said junction to enable said fault indicating means to provide an indication that current flow over said portion of said branch circuit has been interrupted, and alarm switch means connected parallel with said resistance means for shorting out said resistance means in response to an alarm condition to thereby establish a voltage at a third level at said junction, permitting the flow of current through said indicator lamp sufficient to illuminate said lamp, said first circuit means including alarm relay means responsive to a voltage at said third level to inhibit said fault indicating means.

4. A lamp supervisory circuit as set forth in claim 3 wherein said voltage sensing means includes a switching transistor having a control electrode connected to said first circuit means, an output electrode connected to said fault indicating means and an input electrode connected to a source of bias potential for normally reverse biasing said switching transistor.

5. A lamp supervisory circuit as set forth in claim 4 wherein said alarm relay means includes an operating coil connected between said junction and the control electrode of said switching transistor and normally closed contacts serially connected between the output electrode of said switching transistor and said fault indicating means.

6. A lamp supervisory circuit as set forth in claim 5 wherein said fault indicating means includes a relay having a coil connected in series with said contacts of said alarm relay means between the output electrode of said switching transistor and a source of potential.

7. In an alarm condition monitoring circuit including a plurality of indicator lamps each individually operable to indicate an alarm condition when illuminated, a lamp supervisory circuit for detecting failure of any of said indicator lamps comprising a plurality of branch circuits, each including a different one of said indicator lamps and resistance means connected in series across a source of potential to provide a voltage at a first level at the junction point of the indicator lamp and the associated resistance means whenever current is flowing through the branch circuit and a voltage at a second level at said junction point whenever current flow over a portion of the branch circuit, including the indicator lamp, is interrupted, the value of the resistance means in each branch circuit being selected to limit the currents flowing through the branch circuits to values insufficient to cause perceptible illumination of the indicator lamps, voltage sensing means, first circuit means including an alarm relay having a first terminal connected to an input of said voltage sensing means and diode means, including a plurality of diodes each individually connected between a second terminal of said alarm relay and the junction point of a different one of said branch circuits, fault indicating means, said voltage sensing means being operable whenever a voltage at said second level is provided at any one of said junction points to enable said fault indicating means to provide an indication that current flow over the portion of one of said branch circuits including an indicator lamp has been interrupted, and a plurality of switch means, each individually connected in parallel with a different one of said resistance means and each independently operable to short out an associated resistance means in response to an alarm condition to thereby establish a voltage at a third potential at the corresponding junction point, permitting the flow of current through a corresponding indicator lamp sufficient to illuminate the lamp, said alarm relay being energized whenever a voltage at said third level is provided at any one of said junction points to inhibit said fault indicating means.

8. A lamp supervisory circuit as set forth in claim 7 which includes test switch means connected between the second terminal of said alarm relay and a source of potential and operable to extend a voltage at said third level over said diode means to the junction points of all of said branch circuits for effecting illumination of all of said indicator lamps.

9. A lamp supervisory circuit as set forth in claim 7 wherein said voltage sensing means includes a switching transistor having a control electrode connected to said first terminal of said alarm relay, an output electrode connected to said fault indicating means and an input electrode connected to a source of bias potential for normally reverse biasing said switching transistor.

10. A lamp supervisory circuit as set forth in claim 9 wherein said alarm relay includes an operating coil connected between said diode means and the control electrode of said switching transistor and normally closed contacts serially connected between the output electrode of said switching transistor and said fault indicating means.

* * * * *